US012111152B2

(12) United States Patent
Zhao et al.

(10) Patent No.: US 12,111,152 B2
(45) Date of Patent: Oct. 8, 2024

(54) MAGNETIC FLEXIBLE TACTILE SENSING STRUCTURE AND APPLICATION BASED ON FOLDING MAGNETIZATION METHOD

(71) Applicant: Zhejiang University, Hangzhou (CN)

(72) Inventors: Peng Zhao, Hangzhou (CN); Hao Hu, Hangzhou (CN); Xuechun Zhang, Hangzhou (CN); Chengqian Zhang, Hangzhou (CN); Tingyu Wang, Hangzhou (CN); Jianzhong Fu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 412 days.

(21) Appl. No.: 17/656,036

(22) Filed: Mar. 23, 2022

(65) Prior Publication Data

US 2022/0326001 A1 Oct. 13, 2022

(30) Foreign Application Priority Data

Apr. 9, 2021 (CN) .......................... 202110384615.9

(51) Int. Cl.
*G01B 7/24* (2006.01)
*B25J 13/08* (2006.01)
(Continued)

(52) U.S. Cl.
CPC .............. *G01B 7/24* (2013.01); *B25J 13/084* (2013.01); *G01D 5/145* (2013.01); *G01L 1/12* (2013.01); *G01L 5/228* (2013.01)

(58) Field of Classification Search
CPC .......... G01D 5/142; G01D 5/145; G01B 7/24; G01L 1/12; G01L 1/122; G01L 1/125;
(Continued)

(56) References Cited

U.S. PATENT DOCUMENTS

2021/0094260 A1* 4/2021 Zhou ....................... B32B 25/20
2022/0276038 A1* 9/2022 Shen .................... G01R 33/077
(Continued)

FOREIGN PATENT DOCUMENTS

CN 110514331 A * 11/2019
CN 112736406 A * 4/2021 ........... H01F 10/005

OTHER PUBLICATIONS

Saxena, Krishna Kumar, Raj Das, and Emilio P. Calius. "Three decades of auxetics research—materials with negative Poisson's ratio: a review." Advanced Engineering Materials 18.11 (2016): 1847-1870.*

(Continued)

*Primary Examiner* — Herbert K Roberts
(74) *Attorney, Agent, or Firm* — Allen, Dyer, Doppelt + Gilchrist. PA

(57) ABSTRACT

The present disclosure discloses a magnetic flexible tactile sensor structure based on a folding magnetization method, which comprises a flexible body containing a permanent magnetic material; the flexible body has a negative Poisson's ratio structure, and its set area has undergone folding magnetization treatment. The present disclosure also discloses a sensor composed of the above-mentioned sensing structure. The sensor provided by the present disclosure can be applied in sealed and wireless scenarios. The present disclosure can detect the size and position of force. The flexible sensor has broad prospects in the application of the touch skin of robots. The function between the magnetic field-based sensing magnet and the Hall element is contactless. In some cases where it is difficult to establish isolation of the connection lines, it can also be used as an unfettered tactile sensor.

20 Claims, 15 Drawing Sheets

(51) Int. Cl.
  *G01D 5/14* (2006.01)
  *G01L 1/12* (2006.01)
  *G01L 5/22* (2006.01)

(58) Field of Classification Search
  CPC ......... G01L 5/226; G01L 5/228; G01L 5/169;
  B25J 13/081; B25J 13/084
  See application file for complete search history.

(56) References Cited

U.S. PATENT DOCUMENTS

2022/0367101 A1* 11/2022 Lum ...................... H10N 35/00
2023/0170116 A1*  6/2023 Alapan ................... H01F 1/28
                                                              283/82

OTHER PUBLICATIONS

Grima, Joseph N., et al. "Smart metamaterials with tunable auxetic and other properties." Smart Materials and Structures 22.8 (2013): 084016.*

Gabler, Felix, et al. "Magnetic origami creates high performance micro devices." Nature communications 10.1 (2019): 3013.*

Li, Ya, et al. "Origami NdFeB flexible magnetic membranes with enhanced magnetism and programmable sequences of polarities." Advanced Functional Materials 29.44 (2019): 1904977.*

* cited by examiner

MAGNETIC FLEXIBLE TACTILE SENSING STRUCTURE AND APPLICATION BASED ON FOLDING MAGNETIZATION METHOD

CROSS REFERENCE TO RELATED APPLICATION(S)

This patent application claims the benefit and priority of Chinese Patent Application No. 202110384615.9, filed on Apr. 9, 2021, the disclosure of which is incorporated by reference herein in its entirety as part of the present application.

TECHNICAL FIELD

The present disclosure belongs to a physical sensor, more particularly, relates to a magnetic flexible tactile sensing structure and application based on a folding magnetization method.

BACKGROUND ART

Flexible tactile sensor is an emerging field because they can be applied to human-computer interaction and wearable electronic devices. In recent years, there have been some researches on flexible tactile sensors for robotic electronic skins and wearable devices. There are many tactile sensors that use different sensing mechanisms, such as piezoelectric resistance, piezoelectricity, and capacitance. For traditional tactile sensors, the information that can be sensed from the tactile sensor is relatively single and limited to pressure, and it shows that the location of the display shear force or fingertip surface structure and force cannot be identified.

Thesis literature 1 (S. M. Doshi, E. T. Thostenson, Thin and Flexible Carbon Nanotube-Based Pressure Sensors with Ultrawide Sensing Range, ACS Sensors. 3 (2018) 1276—1282. https://doi.org/10.1021/acssensors.8b00378.) mentioned that the flexible pressure sensor based on carbon nano-tubes can only obtain pressure data, and cannot obtain other information.

Still for example, thesis literature 2 (C. Mu, Y. Song, W. Huang, A. Ran, R. Sun, W. Xie, H. Zhang, Flexible Normal-Tangential Force Sensor with Opposite Resistance Responding for Highly Sensitive Artificial Skin, Adv. Funct. Mater. 28 (2018) 1-9. https://doi.org/10.1002/adfm.201707503.) mentioned that flexible normal force sensor with anti-resistance cannot obtain the specific position information of the pressure. In order to perceive more information, a tactile sensor array is used to sense the size and position of the force, but a large number of wires must be used to connect the flexible cover of the robot and the internal control system, which can cause troublesome maintenance. Although liquid metal can alleviate maintenance problems to a certain extent, the burden of large-scale signal processing still hinders the application and development of tactile sensor arrays.

SUMMARY

The present disclosure proposes a flexible tactile structure and a sensor based on an induced magnetic field, which are used to simultaneously detect size and position of the force, and can obtain a linear relationship between the force and the magnetic field change, convenient for data processing.

The sensor can also be used as an unfettered tactile sensor, and can be used as a tactile sensor for robot's shell in extreme environments.

The present disclosure provides a solution to these problems with a linear magnetic flexible sensor based on a folding magnetization method. The magnetic flexible sensor prepared by the folding magnetization method can simultaneously sense the magnitude and position of the force, and has broad application prospects in the field of tactile skin of robots, and the linear relationship between load characteristics and signals makes it easier to process data. The function between the magnetic field-based sensing magnet and the Hall element is contactless. In some cases where it is difficult to establish isolation of the connection lines, it can also be used as an unfettered tactile sensor.

A magnetic flexible tactile sensing structure based on a folding magnetization method includes a flexible main body containing a permanent magnetic material, the flexible main body has a negative Poisson's ratio structure, and its set area has undergone the folding magnetization treatment.

The present disclosure combines the negative Poisson's ratio structure and the folding magnetization processing of the set area to obtain the linear relationship between the force and the magnetic field change, and further it can be applied to tactile sensing. The force application point coordinates can be directly obtained by detecting the magnetic field signal.

Preferably, the set area is an area distributed in a straight line. Preferably, the set area is the area where the crease is located during the folding magnetization process. As a further preference, the folding is to directly fold the flexible main body in half, and the crease is a linear structure. As a further preference, the flexible body has a symmetrical sheet structure, and the crease is its axis of symmetry. The shape of the flexible body can be a symmetrical structure such as a rectangle, a circle, a diamond, a triangle, etc.

Preferably, the folding magnetization adopts longitudinal magnetization. The longitudinal magnetization further improves the magnetization intensity of the set area, and further improves the sensing sensitivity of the subsequent sensor. The "longitudinal magnetization" means: the folded flexible body is arranged to be perpendicular to the magnetic field.

Preferably, the negative Poisson's ratio structure is formed by horizontally staggered splicing of plural sets of triangular hourglass structure chains. In the present disclosure, the plural sets of triangular hourglass structure chains are arranged in multiple rows, and two adjacent triangular hourglass structure chains are staggered (the staggered displacement is the displacement corresponding to the height of the triangle) butted to form an integrated structure.

As a further preference, each set of triangular hourglass structure chain is formed by a plurality of triangular hourglass structures connected longitudinally (that is, the direction where the symmetry axis of the triangle is located) two by two, and each triangular hourglass structure is formed by docking two isosceles triangle frames at the apex. The two triangular frames are connected at the docking position, and the two adjacent triangular hourglass structures are butt connected by the bottom sides of the corresponding isosceles triangular frame. Two adjacent triangle hourglass structure chains share a triangular frame. The two triangle hourglass structure chains are similar to two adjacent triangle frames in opposite directions and share one side; after being docked together, they form a parallelogram structure. The butt joints in each triangular hourglass structure are connected to ensure the characteristics of the negative Poisson's ratio structure. The shared side (the two adjacent triangular hourglass structure chains) and the shared bottom side connect (two adjacent sets of triangular hourglass structure chains) connect the plural triangular hourglass structures into a whole to form a complete flexible body with a negative Poisson's ratio structure.

As a preferred solution, the size of each isosceles triangle frame is: the bottom side is 2-5 mm, the height is 1-2.5 mm; the thickness of the magnetic sheet is 1-3 mm. For example, the size of an isosceles triangle frame may be: the bottom side is 3 mm, the height is 1.5 mm; the thickness of the magnetic sheet is 1-3 mm.

Preferably, the set area is arranged along the direction of the triangular hourglass structure chain (that is, perpendicular to the bottom side of the isosceles triangular frame), and is located at the middle symmetry axis of the magnetic sheet.

Preferably, the flexible body is processed by 3D printing. With this technical solution, flexible bodies with different negative Poisson's ratio structures can be manufactured rapidly.

Preferably, the flexible body is made of organic silica gel adhesive, silicone rubber, fumed silica nanoparticles, and permanent magnetic materials.

As a further preference, the flexible main body is composed of 8%-15% organic silicone adhesive (such as DOWSIL™ SE 1700), 10%-30% silicone rubber (such as Ecoflex 00-30), and 1%-5% gas phase silicon oxide nanoparticles, and 50%-70% permanent magnet materials (such as neodymium iron boron particles with a diameter of 3-10 microns).

A flexible tactile sensor comprises the magnetic flexible tactile sensing structure based on the folding magnetization method described in any one of the above technical solutions and a three-axis Hall sensor for collecting changes of magnetic field intensity.

The magnetic field strength of the magnetic sheet which has been half-folding magnetized will change with the deformation and size of different positions of the sample. The Hall element below can read the magnetic field strength change signal in real time to obtain the corresponding pressing position and a magnitude of the pressing force. During use, the force applied to the force point is determined by detecting the magnitude of Bz; or the y-axis coordinate of the force applying point is determined by detecting By and the size of the x-axis coordinate; the z-axis direction is parallel to the force direction, and the x-axis direction is parallel to the direction of the set area is the same.

After folding magnetization, the present disclosure performs test above the 3D Hall sensor to obtain three-axis signals Bx, By and Bz. There is linear relationship between the force and the Bz signal, and there is linear relationship between By and the y coordinate; the linear relationship between the load characteristics and the signals is very useful for signal analysis and processing, making it easier to process data.

Compared with the prior art, the beneficial effects of the present disclosure are as follows:

For a magnetic elastomer, the magnetic field strength is limited by the low proportion of magnetic particles. It is difficult to obtain a strong magnetic field by ordinary magnetization methods. The present disclosure introduces origami magnetization to achieve the purpose of enhancing the magnetic field strength at the folding position. Folding magnetization greatly increases the intensity of the magnetic field near the designated position, which makes the magnetic elastomer generate sufficient magnetic flux density without hard magnets. Combined with a highly sensitive three-axis Hall sensor, it can be used as a soft tactile sensor to obtain multi-dimensional load information.

The present disclosure uses 3D printing technology to quickly obtain the required complex structure. The present disclosure uses 3D printing technology to construct a flexible magnetic sheet with a negative Poisson's ratio mechanism, which further expands the application scope of the present disclosure. At the same time, it can better adapt to the characteristics of the sensor, so that the magnetic signal change and the force change of the small magnetic sheet present a linear relationship.

The present disclosure adopts the magnetic sheet structure of the triangular hourglass structure, which can make the magnetic signal change and the force change of the small magnetic sheet present a linear relationship, and can detect the magnitude and position of the force at the same time. At the same time, the Hall element is used to detect changes in the magnetic field, and origami magnetization is introduced to enhance the magnetic field strength at the folding position where the Hall sensor is placed. The magnetic field intensity near the designated location is greatly improved, which makes the magnetic elastomer generate sufficient magnetic flux density without hard magnets. The present disclosure uses the Hall element to detect changes in the magnetic field, and places the folded magnetized small magnetic sheet directly above the Hall element, which greatly improves the magnetic field strength near the designated position, and it can be used as a soft touch sensor to obtain multi-dimensional load information.

Meanwhile, the present disclosure adopts a magnetic sheet structure (flexible body) with a specific structure, which makes the magnetic field signal and the force change linearly, making it easier for data processing.

Moreover, the sensor provided by the present disclosure can be used in sealed and wireless scenarios. The present disclosure can detect the size and position of the force. The flexible sensor has broad prospects in the application of robot touch skin. The function between the magnetic field-based sensing magnet and the Hall element is contactless. In some cases where it is difficult to establish isolation of the connection lines, it can also be used as an unfettered tactile sensor.

DETAILED DESCRIPTION OF THE EMBODIMENTS

In the following, the present disclosure will be further described in conjunction with the embodiments:

I. Manufacturing of the Magnetic Sheet:

1. Ratio of the Materials

According to the material mass ratio, SE 1700 (DOW silicone adhesive DOWSIL™ SE 1700, 11.71%), SE 1700 supporting catalyst (1.17%), Ecoflex 00-30 Part B (21.78%), fumed silica nanoparticles (2.72%), and the proportion of neodymium iron boron particles (62.62%) with a relative diameter of 5 μmd, the 3D printing material is obtained by mixing and defoaming with an adjusting mixer (Thinky, AR100).

Figure 1:
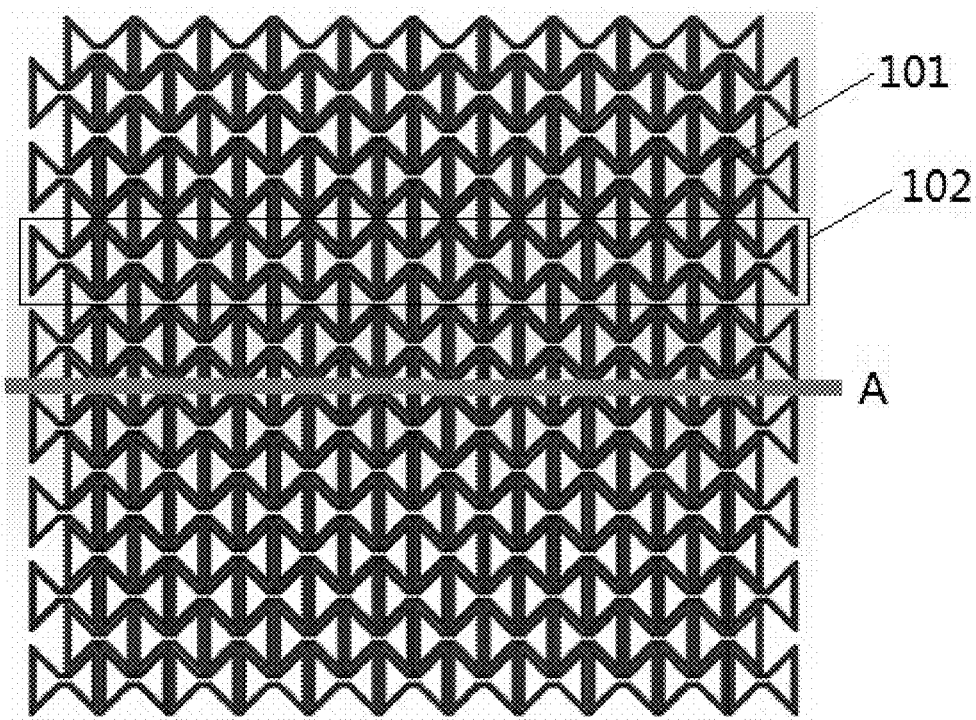
FIG. 1 is a schematic diagram of the magnetic sheet structure of the isosceles triangle negative Poisson's ratio structure used in an embodiment.
Figure 2:
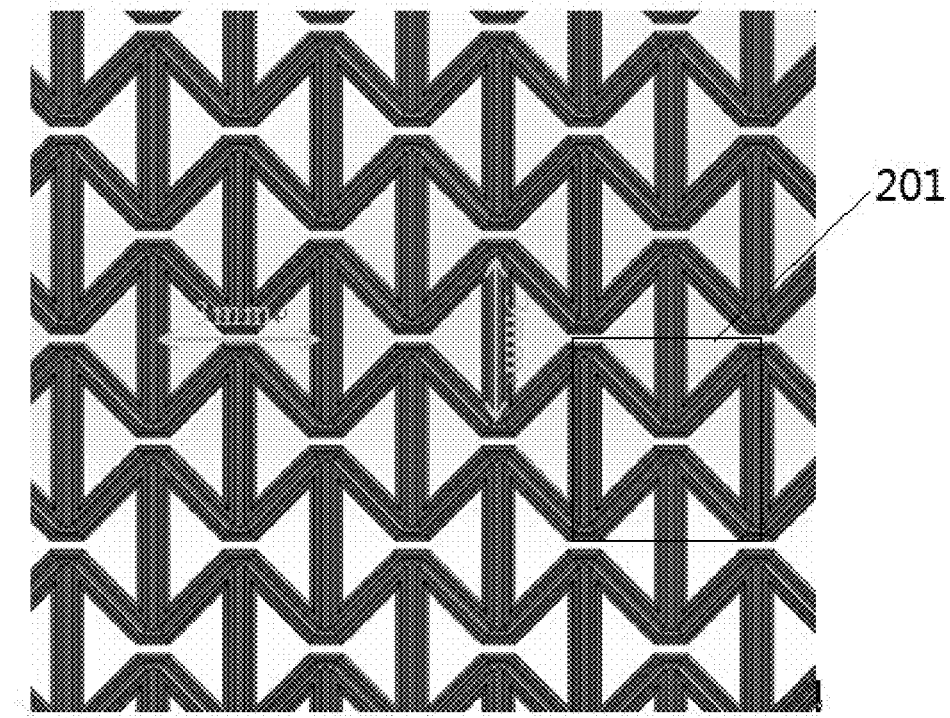
FIG. 2 is a partial enlarged view of a designated position (circle) in FIG. 1.

The 3D model of the magnetic sheet as shown in FIGS. 1 and 2 is designed by using the existing 3D software, and slicing is performed by using the existing slicing software to obtain the Gcode codes corresponding to the 3D model, and then the subsequent printing is performed.

Figure 3A:
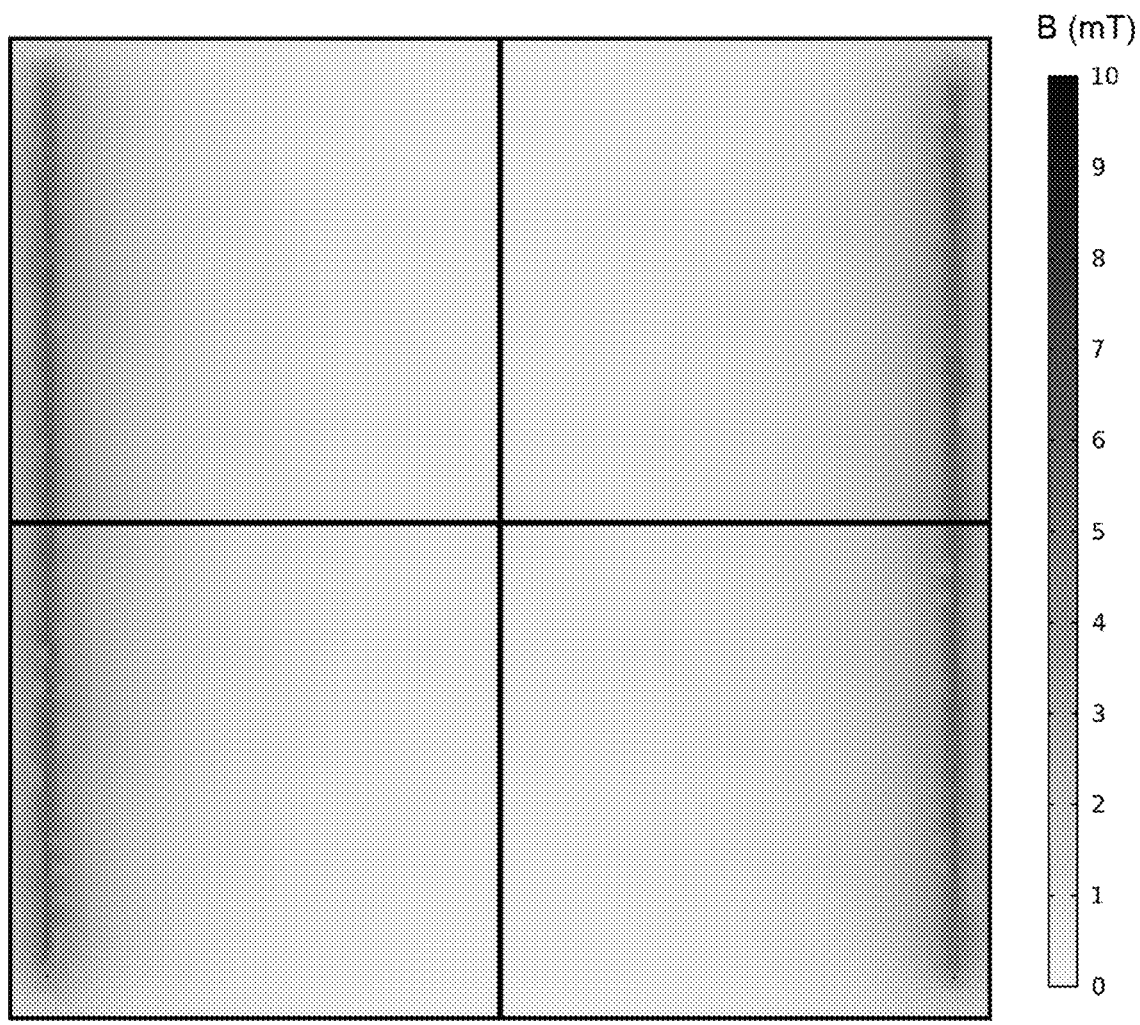
FIG. 3(a) is a distribution diagram of the magnetic field intensity after the magnetic sheet structure shown in FIG. 1 is directly subjected to transverse magnetization.
Figure 3B:
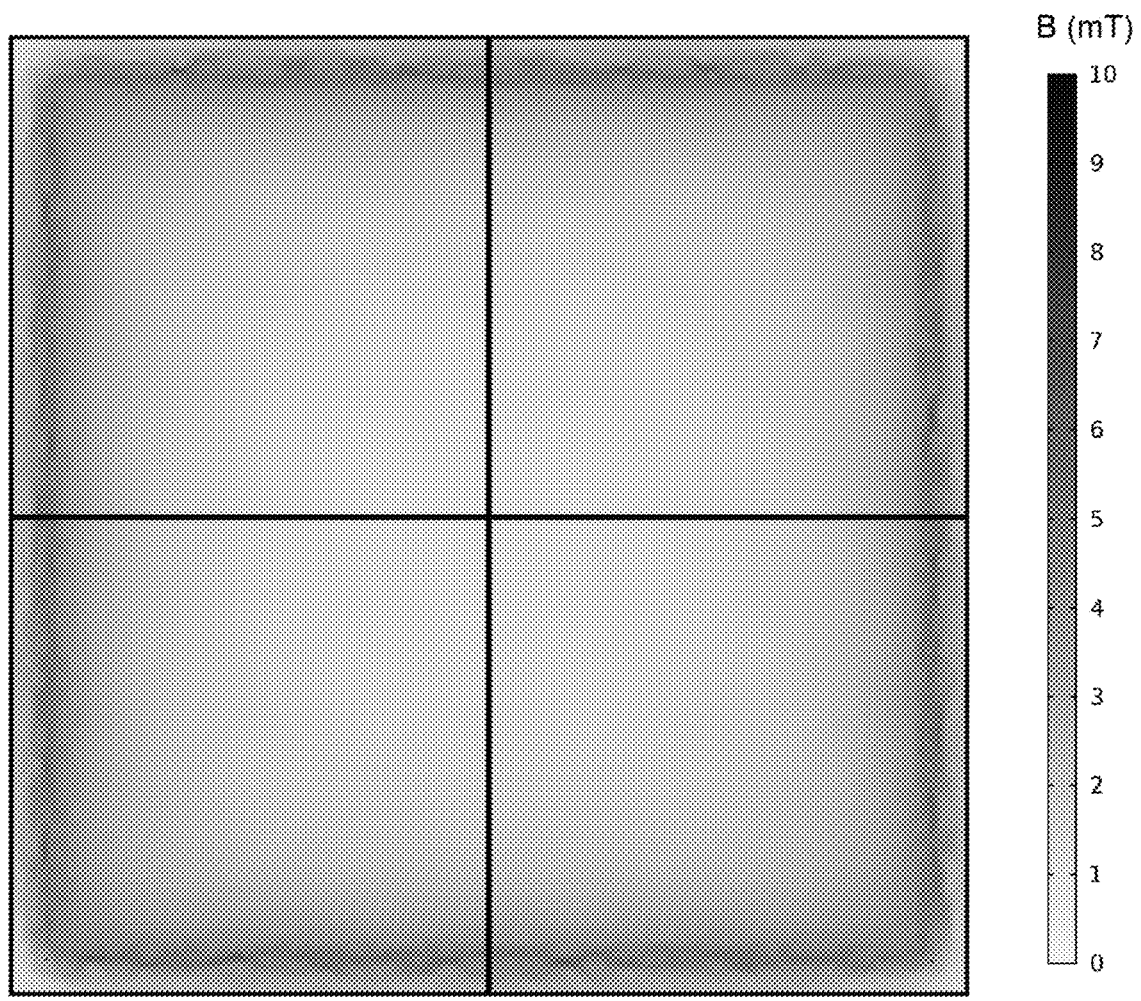
FIG. 3(b) is a distribution diagram of the magnetic field intensity after the magnetic sheet structure shown in FIG. 1 is directly subjected to longitudinal magnetization.
Figure 3C:
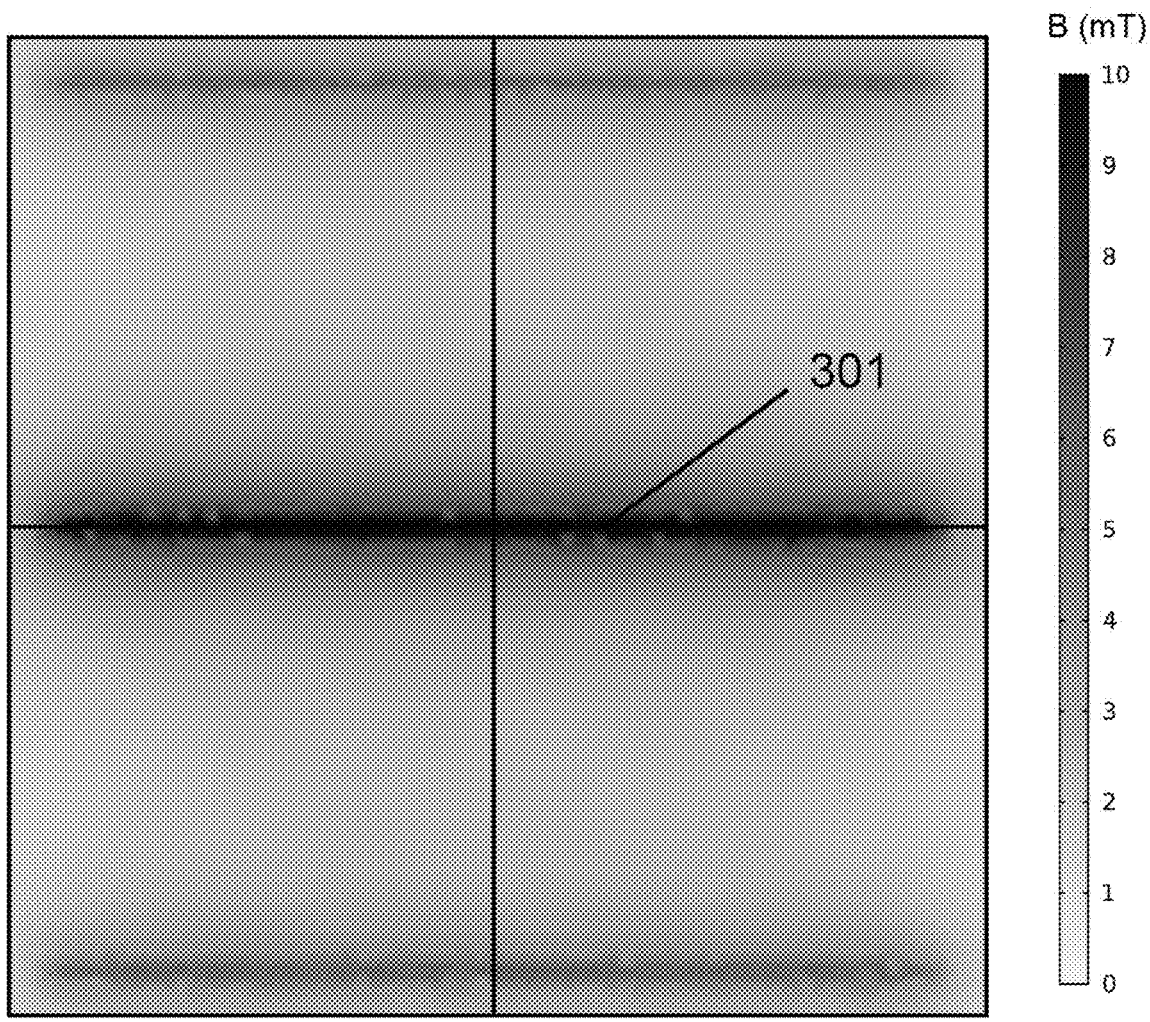
FIG. 3(c) is a distribution diagram of the magnetic field intensity of the magnetic sheet structure shown in FIG. 1 after being folded in half and longitudinally magnetized.

Complex structures can be rapidly obtained by the 3D printing technology. The present disclosure uses 3D printing technology to construct a magnetic sheet sample of the negative Poisson's ratio mechanism, as shown in FIG. 3. The size of a single negative Poisson's ratio structure is an isosceles triangle with a bottom length of 3 mm, which can better adapt to the characteristics of the sensor, so the magnetic signal change and the force change of the small magnetic sheet present a linear relationship.

2. Specific Steps (1) Put the printing materials into a syringe (Nordson, PN: 7012096) and equip a nozzle (Nordson, PN: 7018298), use a dispensing controller to control the air pump (Outstanding, OTS-550) to control the printing materials to be extruded softly and evenly.

(2) Fix the syringe with a mold to the nozzle of the three-dimensional mobile platform (Panowin, F1), and use the corresponding Gcode codes to print.

(3) Put the obtained printed sample into a 120-degree oven and heat it for three hours to obtain a solid magnetic sheet; the overall size is: a thickness of 2 mm, an area of 30 mm×30 mm, and each triangle in the triangular hourglass structure has a length of 3 mm for the bottom side of and a height of 1.5 mm.

As shown in FIG. 1, the present disclosure, by using the advantage that 3D printing can quickly obtain a complex structure, uses an isosceles triangle negative Poisson's ratio structure with a base length of 3 mm. This structure can make the magnetic signal change and force-receiving change of a small magnetic sheet present a linear relationship.

As shown in FIG. 1, a magnetic flexible tactile sensing structure based on a folding magnetization method includes a flexible body 101 containing a permanent magnetic material. The flexible body has a negative Poisson's ratio structure and its set area (the position where line A is located in FIG. 1) has been folded and magnetized.

In this embodiment, the flexible body is a 30 mm×30 mm square magnetic sheet, and its set area 301 is a linearly distributed area, that is, the area where the axis of symmetry is located (see FIG. 3(*c*)), and the set area 301 is the area where the crease (A) is located during the folding magnetization process. During the magnetization, the square flexible main body is directly folded in half, and the crease is a straight line structure.

The negative Poisson's ratio structure is formed by horizontally (the vertical direction in the FIGURE) staggered stitching plural sets of triangular hourglass structure chains 102. In this embodiment, there are 16 sets of triangular hourglass structure chains 102. In the present disclosure, the 16 sets of triangular hourglass structure chains are arranged in multiple rows, and two adjacent triangular hourglass structure chains are staggered (the staggered displacement is the displacement corresponding to the height of the triangle) to form an integrated structure.

Each set of triangular hourglass structure chain is formed by docking the plural triangular hourglass structures 201 longitudinally (that is, the direction of the symmetry axis in the triangle, the horizontal direction in FIG. 2) two-by-two, and each triangular hourglass structure is composed of two isosceles triangular frames. Each triangular hourglass structure is formed by butting two isosceles triangle frames at the apex, and the two triangular frames are connected at the butt joint; two adjacent triangular hourglass structures are butted and connected by the bottom side of the corresponding isosceles triangular frame. Two adjacent triangle hourglass structure chains share a triangular frame. In the two triangle hourglass structure chains, two similar adjacent triangle frames are opposite in direction and share one side. After being connected together, they form a parallelogram structure. The butt joints in each triangular hourglass structure are connected to ensure the characteristics of the negative Poisson's ratio structure. The shared side (the adjacent two sets of triangular hourglass structure chains) and the shared bottom side (two adjacent triangular hourglass structures in a triangular hourglass structure chain) connect the plural triangular hourglass structures into a whole to form a complete flexible body with a negative Poisson's ratio structure.

II. Magnetization

Specific steps: fold the sample and put it in the middle of a two-pole electromagnet, with a magnetization intensity of 1.5 T, to obtain a successfully magnetized sample.

For a magnetic elastomer, the magnetic field strength is limited by the low proportion of magnetic particles. It is difficult to obtain a strong magnetic field through ordinary magnetization methods (as shown in FIG. 3(*a*) and FIG. 3(*b*)). The present disclosure introduces origami magnetization to achieve the purpose of enhancing the magnetic field strength at the folded position where the Hall sensor is arranged, as shown in FIG. 3(*c*). Folding magnetization greatly increases the intensity of the magnetic field near the designated position, which makes the magnetic elastomer generate sufficient magnetic flux density without a hard magnet. Combined with a highly sensitive three-axis Hall sensor, it can be used as a soft tactile sensor to obtain multi-dimensional load information.

III. Different Positions of Force-Magnetic Field Change Detection

Figure 4A:
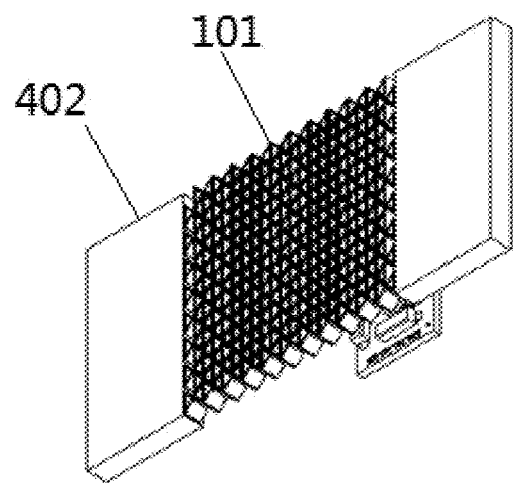
FIG. 4(a) is a schematic diagram of the three-dimensional structure of clamping the magnetic sheet shown in FIG. 1 above the 3D Hall sensor.
Figure 4B:
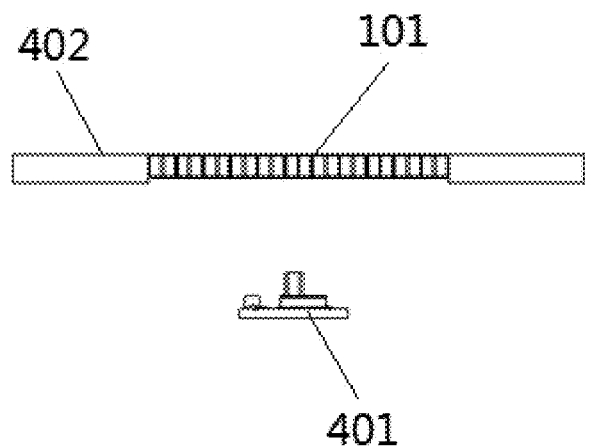
FIG. 4(b) is a side view of the structure shown in FIG. 4(a)

Fix the Hall element below the middle of the sample to obtain the signal of the magnetic field intensity change caused by the deformation of the sample in real time. Specifically, a silicone sheet 402 of equal thickness is pasted on both sides of the magnetic sheet 101 for clamping, and then it is placed above the 3D Hall sensor 401, as shown in FIG. 4 (*a*) and FIG. 4 (*b*). The magnetic field strength of the sample that has been folded and magnetized will change with the deformation and size of the sample at different positions. The Hall element below can read the magnetic field strength change signal in real time to obtain the corresponding pressing position and a magnitude of the pressing force.

Figure 5:
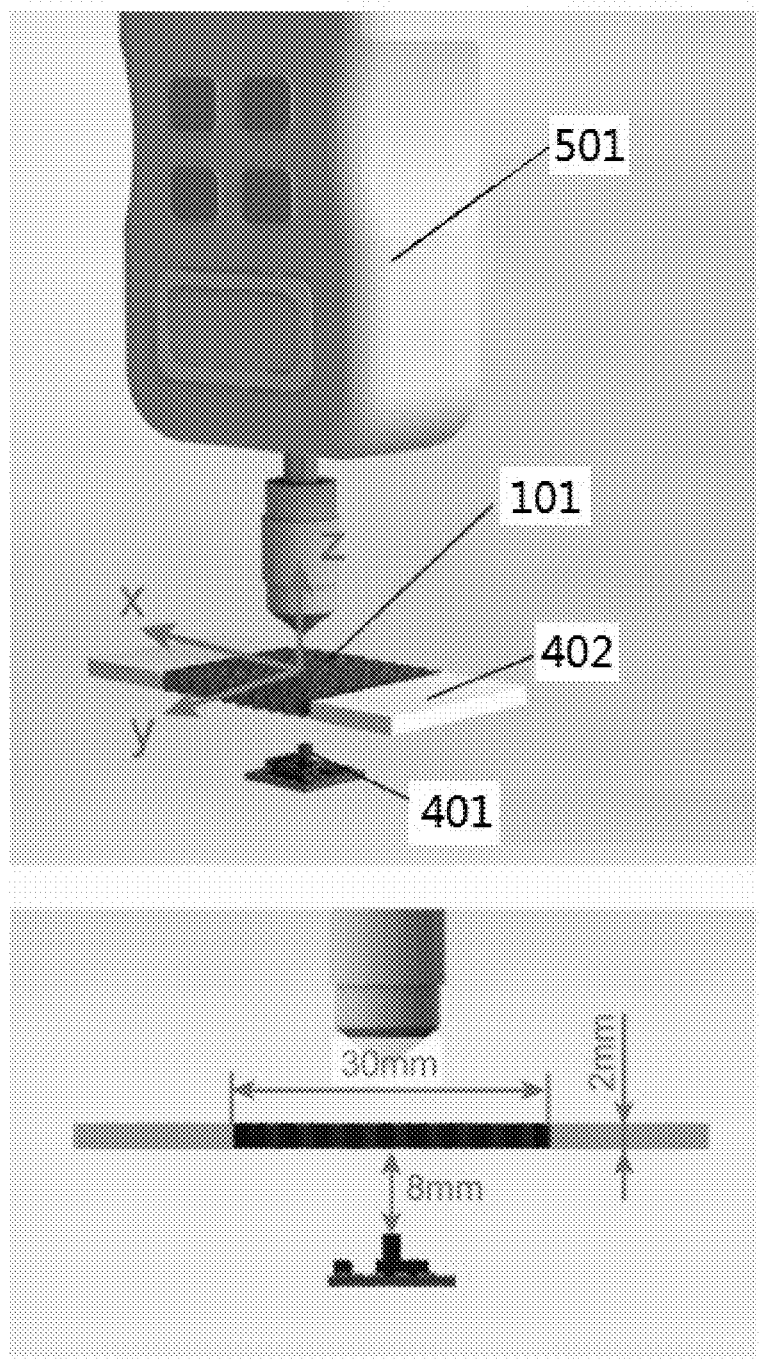
FIG. 5 is a schematic diagram of the cooperation relationship among the dynamometer, the magnetic sheet and the 3D Hall sensor.
Figure 6:
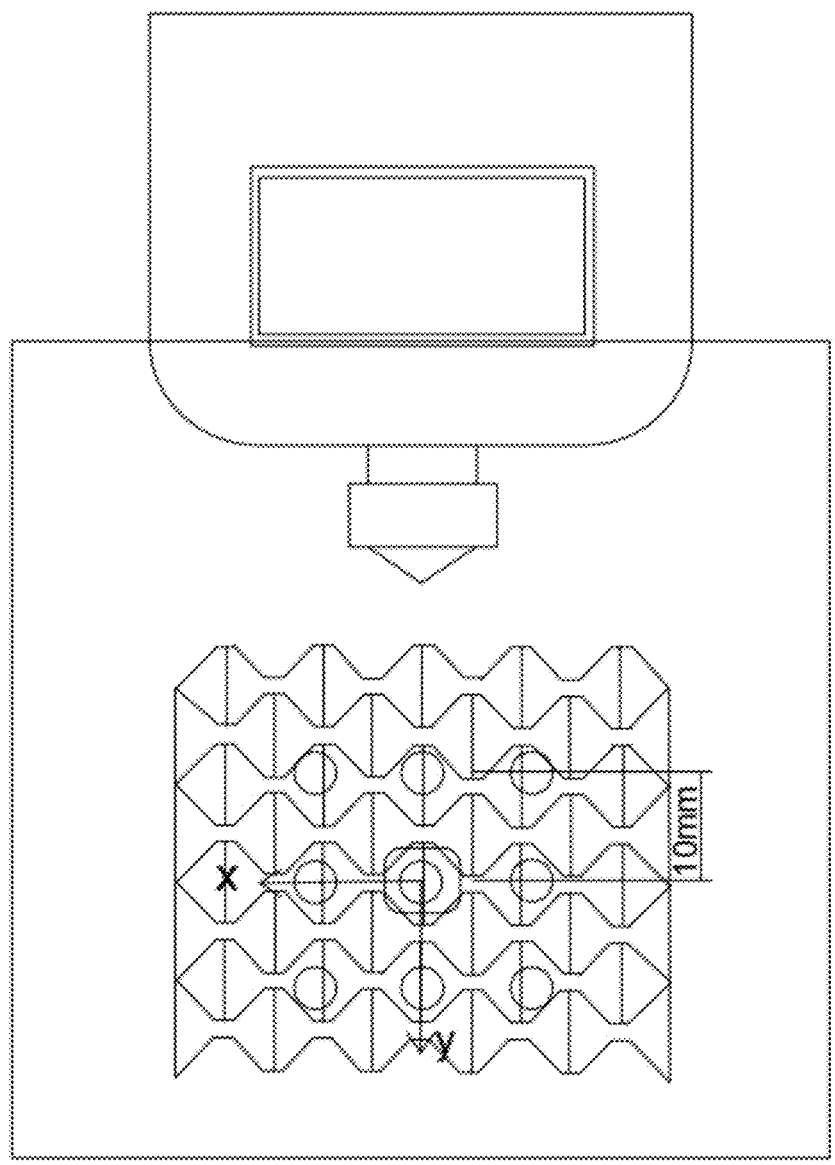
FIG. 6 is a schematic diagram of nine-point test in the embodiment.
Figure 7A:
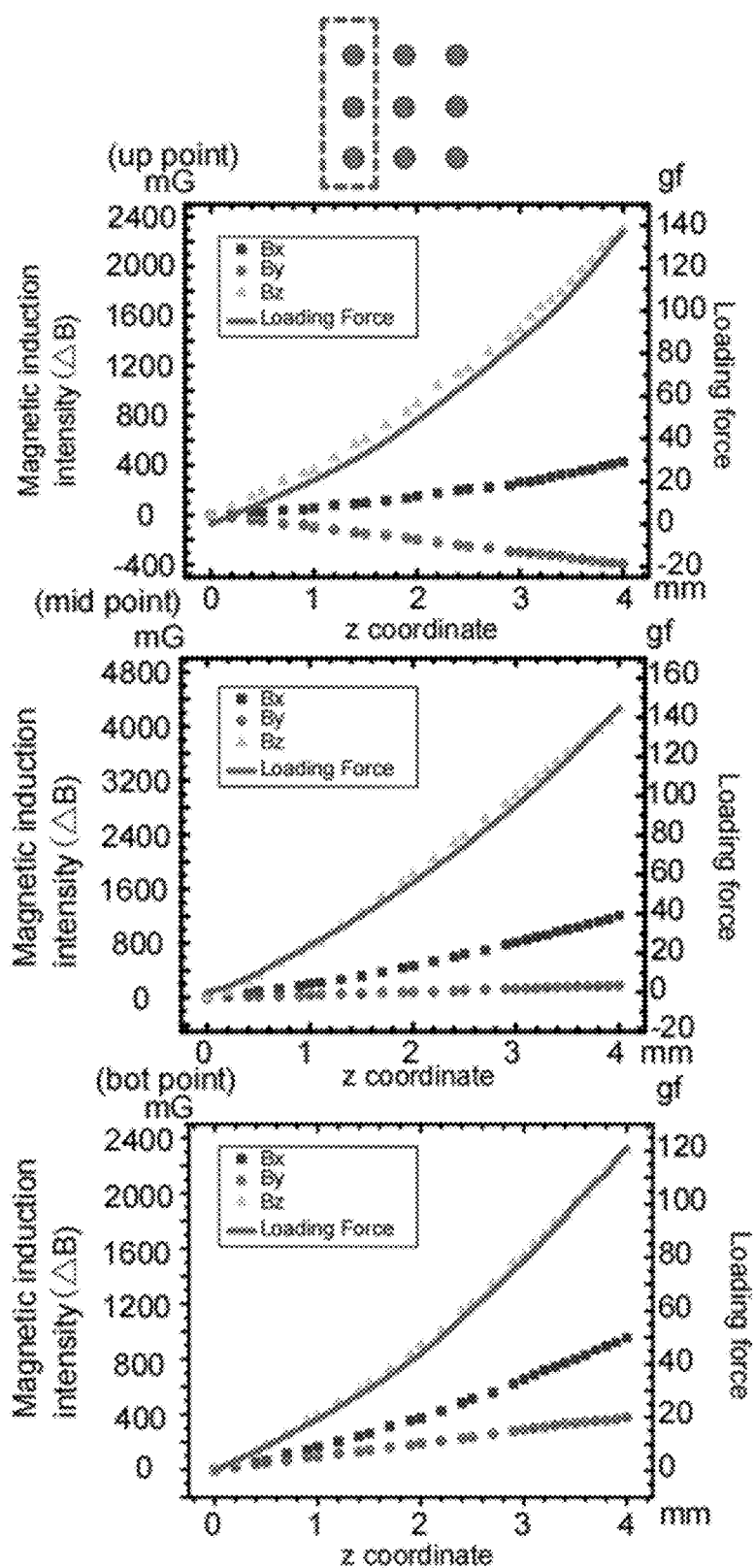
FIGS. 7(*a*)-7(*c*) are curve graphs of nine-point test results.
Figure 7B:
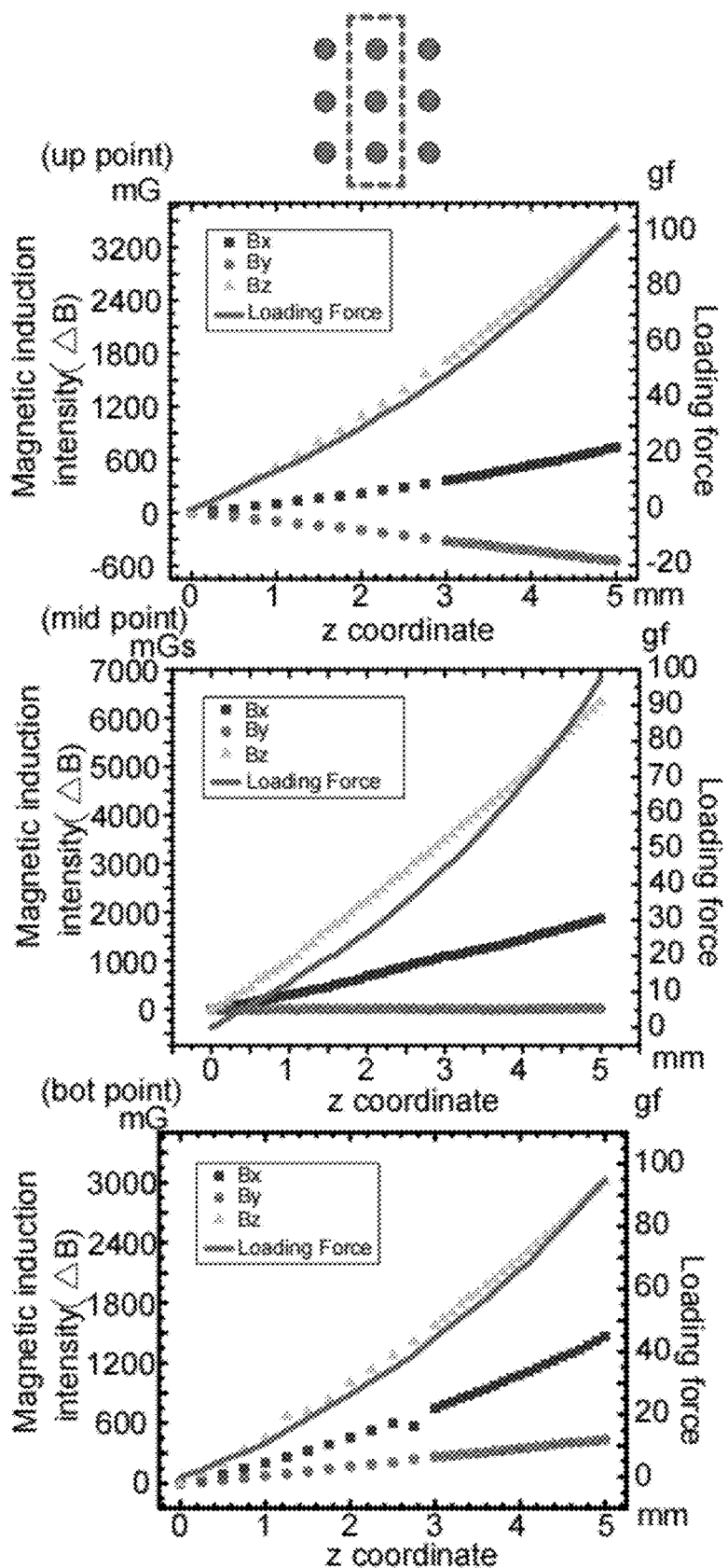
Figure 7C:
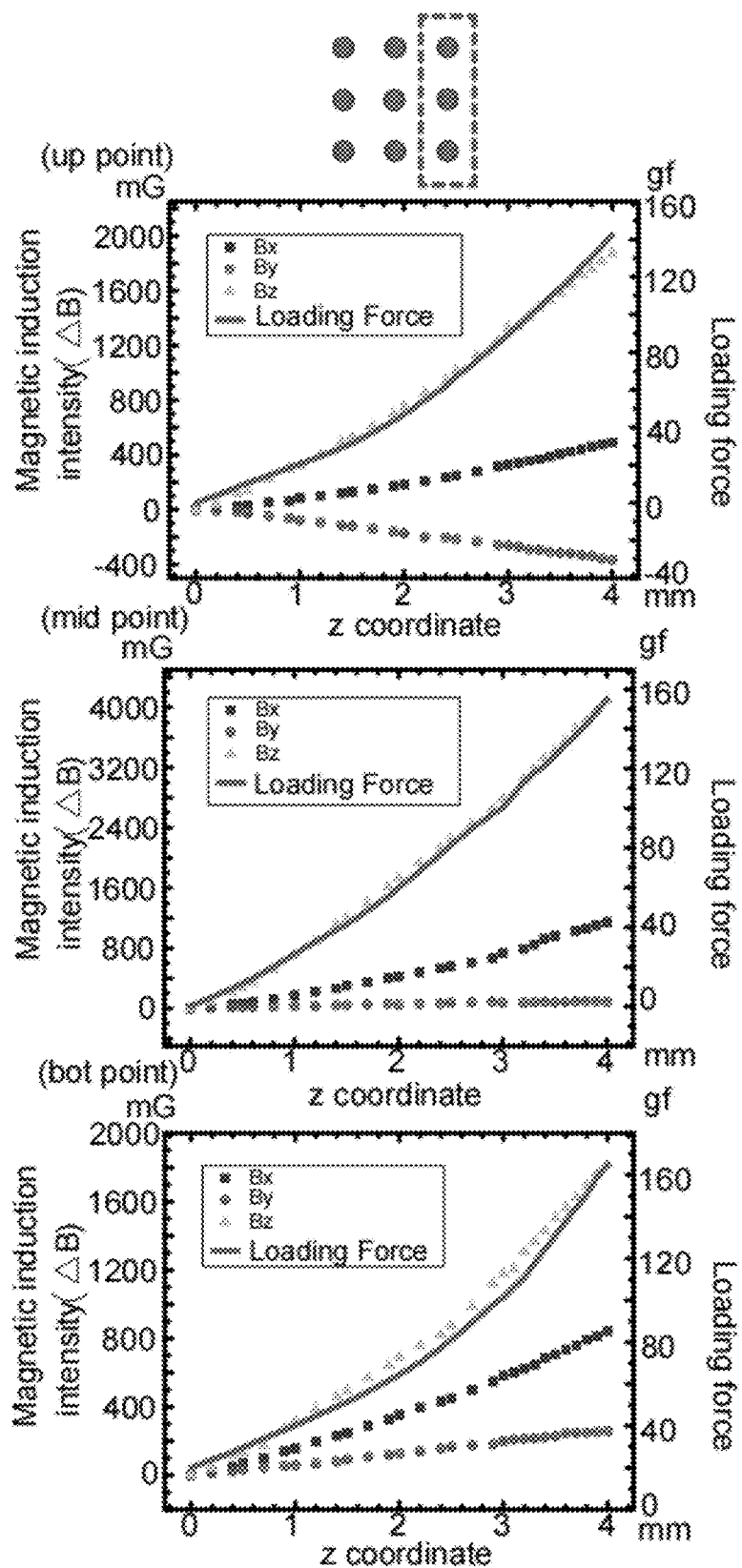

(1) Nine-Point Test:

Use the assembly structure and coordinate system shown in FIG. 5 (the origin is the center of the square magnetic sheet), there are nine points along the x and y directions of the small magnetic sheet, with a spacing of 10 mm respectively, and they are defined from top to bottom and from left to right as points (a)-(i), as shown in FIG. 6. For each point, the contact point of the dynamometer 501 starts to drop from z=0, and the signal data of Bx, By, and Bz and the reading of the dynamometer are recorded at each measurement position. The relationship results between the magnetic change and force at different positions of the sample are as shown FIG. 7(a)-FIG. 7(c); as the position of the dynamometer decreases (in FIG. 7(a)-FIG. 7(c), take a negative values if the ordinate is z coordinate), the magnetic sheet above the magnetic Hall sensor is closer to the Hall sensor. The absolute values of Bx, By, and Bz signals all increase accordingly. Among the three signals, Bz has the largest increase, while By has the smallest one. At y=10 mm, the value of By increases as the dynamometer decreases, and at y=−10 mm, the value of By decreases as the dynamometer decreases. At y=0 mm, the value of By does not change. Combined with the magnetic field distribution after magnetization, it can be inferred that the signal of By is symmetrical with the x-axis. When the dynamometer presses two symmetrical points on the x-axis, By signals with the same magnitude and opposite directions will be generated. Therefore, the relative position of the y-axis coordinate of the pressed sample can be deduced from the obtained different By magnetic field signal magnitudes and directions. When the x-coordinate is known, the y-coordinate of the force point can be accurately determined.

Figure 8A:
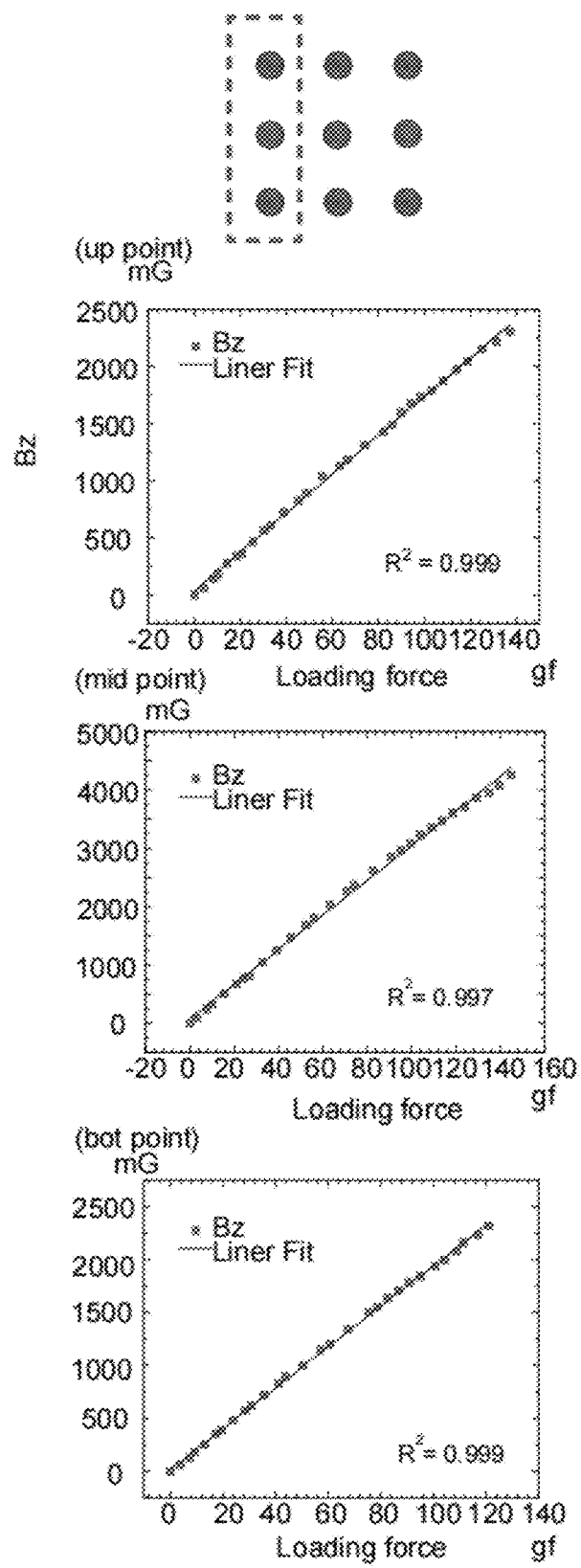
FIGS. 8(*a*)-(*c*) are result diagrams of linear fitting of the Bz signal and the force in the nine-point test.
Figure 8B:
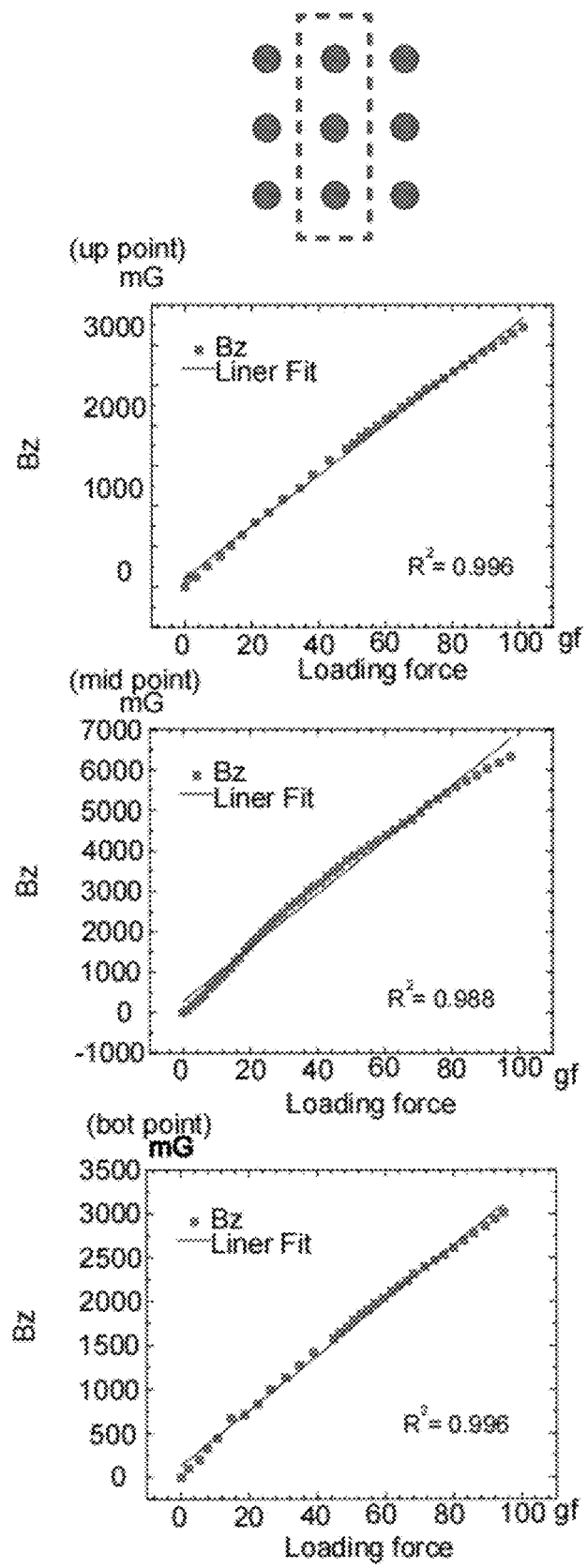
Figure 8C:
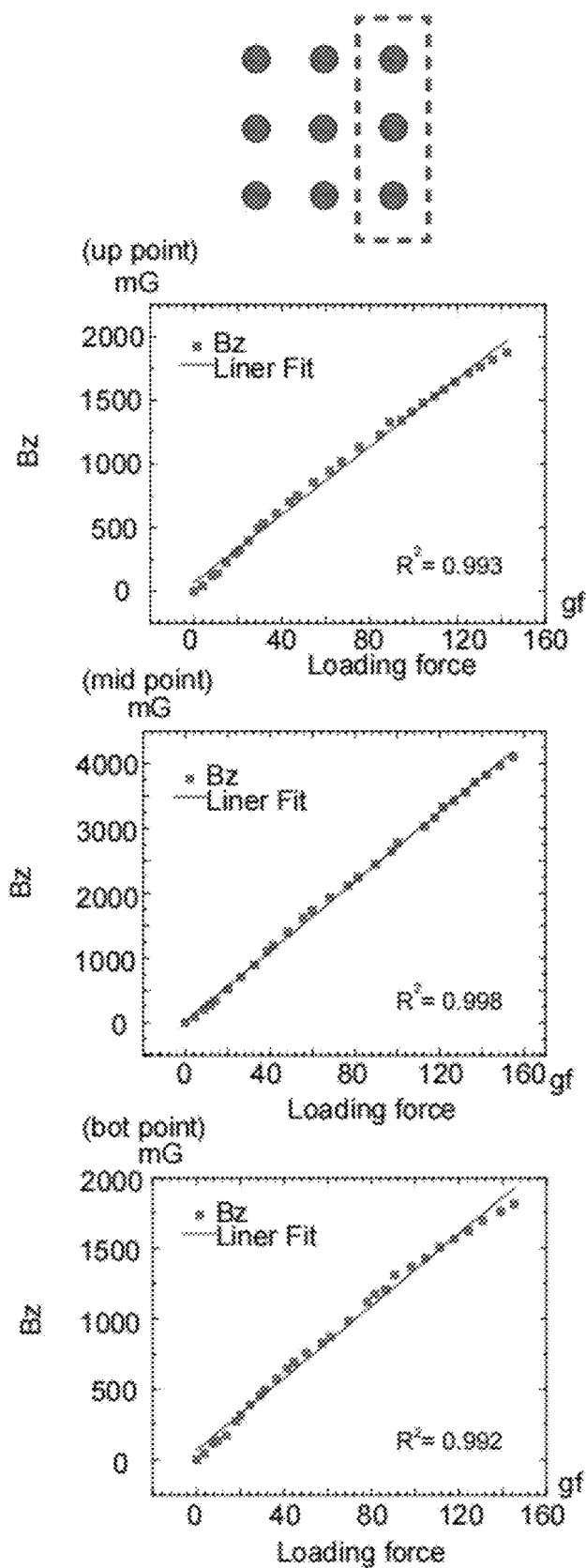

The relationship between the Bz signal and the force is extracted separately, as shown in FIG. 8(a)-FIG. 8(c), which are the linear fitting results of the Bz signal and the force in this embodiment. Except for the center point, the value of $R^2$ is above 0.99, while the value of $R^2$ at the center point is 0.988. The linear relationship between the signals facilitates signal processing. The distribution of the magnetic field in space is non-linear. In the case of folded magnetization, the distribution of the magnetic field is more complicated. When the load is perpendicular to the plane, complex strain will occur in the elastomer and the magnetic field will also change. Under the premise of this structure, the magnitude of the load force has a linear relationship with the Bz signal. This characteristic is the result of the interaction of the material, the structure and the magnetic field distribution. It can be seen that the magnitude of the load force can be judged by using the magnitude of the Bz signal.

(2) Straight Line Test

Figure 9:
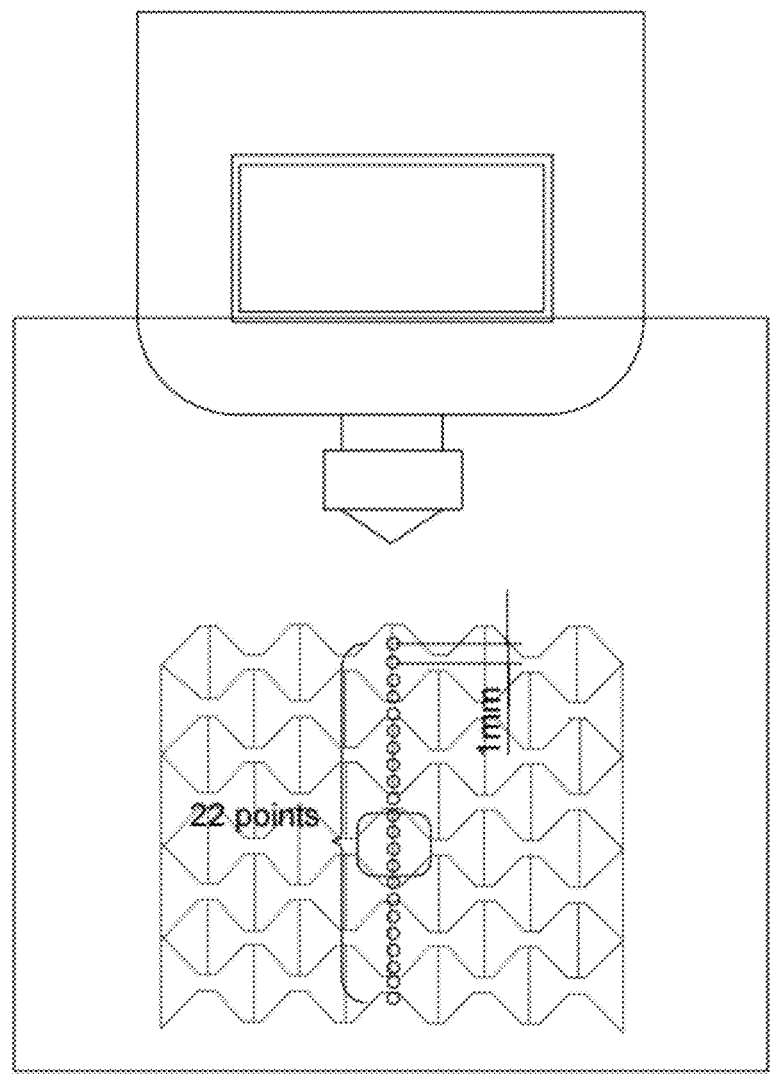
FIG. 9 is a schematic diagram of a straight line test in an embodiment.
Figure 10A:
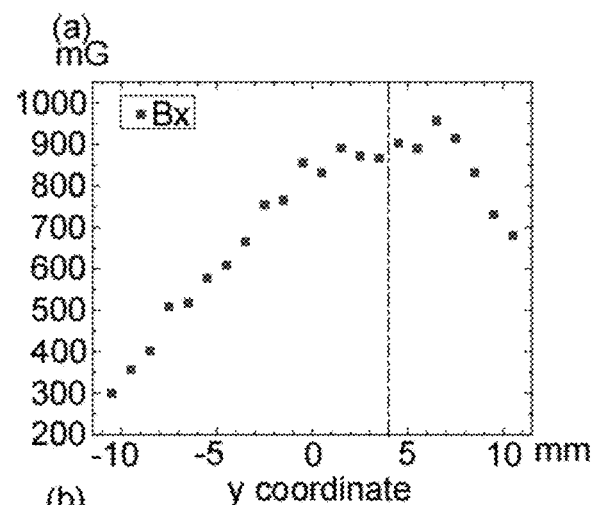
FIGS. 10(*a*)-10(*c*) show results of the straight line test.
Figure 10B:
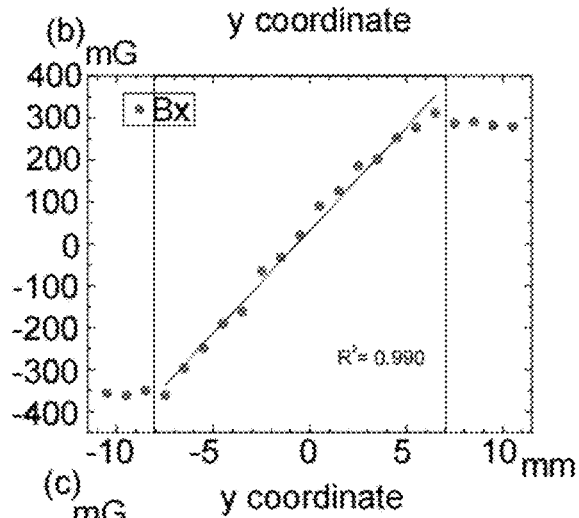
Figure 10C:
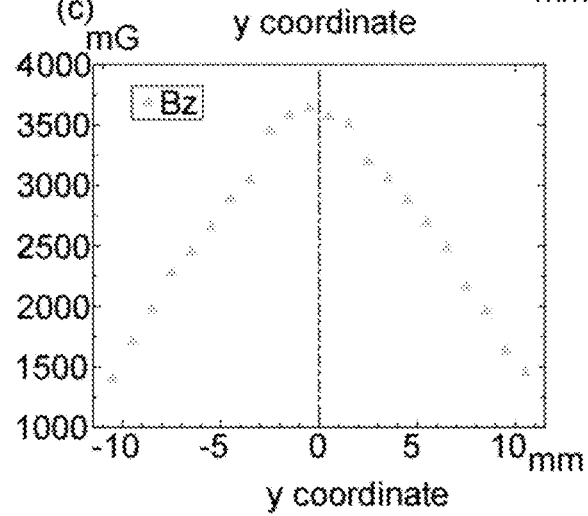

As shown in FIG. 9, in this experiment, the contact of the dynamometer moves along the y axis from Y=−10.5 mm to Y=10.5 mm, a total of 22 points (x=0). The result is shown in FIG. 10.

In the above, Bx first increases linearly, and then it enters a stage phase, and finally begins to decrease. In a certain area, By is linear, and $R^2$ is 0.990. The signal By tends to be stable when it is far from the center point, that is, it exceeds the gray part in FIG. 10(b). The change of the Bz signal is the highest near the middle. The curve is symmetrical to the y axis as shown in FIG. 10 (c). The Bx sensor is placed at Y=4 mm, so the Bx curve is asymmetric with the x axis, and the stable period of the highest Bx is close to Y=4 mm. Both the Bx signal and the By signal exhibit linear intervals, while the Bz is symmetrical with respect to the x-axis. According to the experiment, the Bx and By signals are more suitable for predicting the position of the load point than the Bz signal, while the Bz signal is more suitable for measuring the force.

To sum up, combined with the magnetic field intensity change detection element, it can predict the position of the load point by the values of Bx and By (especially, the y coordinate can be determined more accurately). The force of the load point can be predicted by using the magnitude of the Bz signal.

The present disclosure discloses a magnetic flexible tactile sensing structure based on a folding magnetization method, which comprises a flexible body containing a permanent magnetic material; the flexible body has a negative Poisson's ratio structure, and its set area has undergone folding magnetization treatment. The present disclosure also discloses a sensor composed of the above-mentioned sensing structure. The sensor provided by the present disclosure can be applied in sealed and wireless scenarios. The present disclosure can detect the size and position of the force. The flexible sensor has broad prospects in the application of touch skin of robots. The function between the magnetic field-based sensing magnet and the Hall element is contactless. In some cases where it is difficult to establish isolation of the connection line, it can also be used as an unfettered tactile sensor. The present disclosure adopts the magnetic sheet structure of the triangular hourglass structure, which makes the magnetic signal change and the force change of the small magnetic sheet present a linear relationship, and detects the magnitude and position of the force at the same time.

The invention claimed is:

1. A magnetic flexible tactile sensing structure based on a folding magnetization method, the magnetic flexible tactile sensing structure comprising:
a flexible body comprising a permanent magnetic material, the flexible body having a negative Poisson's ratio structure, and a set area having undergone folding magnetization treatment.

2. The magnetic flexible tactile sensing structure according to claim 1, wherein the set area is an area where a crease is located during a folding magnetization process.

3. The magnetic flexible tactile sensing structure according to claim 1, wherein the folding magnetization adopts longitudinal magnetization.

4. The magnetic flexible tactile sensing structure according to claim 1, wherein the negative Poisson's ratio structure is formed by horizontally interlacing and splicing plural sets of triangular hourglass structure chains.

5. The magnetic flexible tactile sensing structure according to claim 4, wherein each set of triangular hourglass structure chain is formed by butting a plurality of triangular hourglass structures longitudinally two-by-two, and each triangular hourglass structure is formed by butting two isosceles triangle frames at vertices, and the two triangle frames are connected at the butting place; two adjacent triangle hourglass structures are butted and connected by a bottom side of the corresponding isosceles triangle frame.

6. The magnetic flexible tactile sensing structure based on a folding magnetizing method according to claim 5, wherein the size of each isosceles triangle frame is: the bottom side is 2-5 mm, the height is 1-2.5 mm; the thickness of the magnetic sheet is 1-3 mm.

7. The magnetic flexible tactile sensing structure according to claim 1, wherein the flexible body is obtained by 3D printing.

8. The magnetic flexible tactile sensing structure according to claim 1, wherein the flexible body is made from silicone adhesive, silicone rubber, fumed silica nanoparticles, and permanent magnet materials.

9. The magnetic flexible tactile sensing structure according to claim 7, wherein the flexible body is made from silicone adhesive, silicone rubber, fumed silica nanoparticles, and permanent magnet materials.

10. A flexible tactile sensor comprising:
a flexible body containing a permanent magnetic material, the flexible body comprising a negative Poisson's ratio structure, and a set area having undergone folding magnetization treatment; and
a magnetic induction sensor for collecting changes in magnetic field intensity.

11. The flexible tactile sensor according to claim 10, wherein the set area is an area where a crease is located during a folding magnetization process.

12. The flexible tactile sensor according to claim 10, wherein the folding magnetization adopts longitudinal magnetization.

13. The flexible tactile sensor according to claim 10, wherein the negative Poisson's ratio structure is formed by horizontally interlacing and splicing plural sets of triangular hourglass structure chains.

14. The flexible tactile sensor according to claim 13, wherein each set of triangular hourglass structure chain is formed by butting a plurality of triangular hourglass structures longitudinally two-by-two, and each triangular hourglass structure is formed by butting two isosceles triangle frames at vertices, and the two triangle frames are connected at the butting place; two adjacent triangle hourglass structures are butted and connected by a bottom side of the corresponding isosceles triangle frame.

15. The flexible tactile sensor according to claim 14, wherein the size of each isosceles triangle frame is: the bottom side is 2-5 mm, the height is 1-2.5 mm; the thickness of the magnetic sheet is 1-3 mm.

16. The flexible tactile sensor according to claim 10, wherein the flexible body is obtained by 3D printing.

17. The flexible tactile sensor according to claim 10, wherein the flexible body is made from silicone adhesive, silicone rubber, fumed silica nanoparticles, and permanent magnet materials.

18. The flexible tactile sensor according to claim 16, wherein the flexible body is made from silicone adhesive, silicone rubber, fumed silica nanoparticles, and permanent magnet materials.

19. The flexible tactile sensor according to claim 10, wherein the magnetic induction sensor is a three-axis Hall sensor which determines force applied to a force point by detecting a magnitude of Bz; or determines coordinate relative position of y-axis of the force applying point by detecting a magnitude of By; the z-axis direction is parallel to the force-receiving direction, and the x-axis direction is consistent with the direction of the set area.

20. The flexible tactile sensor according to claim 11, wherein the magnetic induction sensor is a three-axis Hall sensor which determines force applied to a force point by detecting a magnitude of Bz; or determines coordinate relative position of y-axis of the force applying point by detecting a magnitude of By; the z-axis direction is parallel to the force-receiving direction, and the x-axis direction is consistent with the direction of the set area.

* * * * *